Patented May 18, 1937

2,080,704

UNITED STATES PATENT OFFICE 2,080,704

NITRO-DYESTUFFS AND A PROCESS OF PREPARING THEM

Erich Fischer, Bad Soden in Taunus, and Walter Gmelin, Frankfort-on-the-Main-Hochst, Germany, assignors to General Aniline Works, Inc., New York, N. Y., a corporation of Delaware No Drawing. Application December 17, 1935, Serial No. 54,939. In Germany December 22, 1934

10 Claims. (Cl. 260—124)

The present invention relates to nitro-dyestuffs and to a process of preparing them; more particularly it relates to compounds of the following general formula

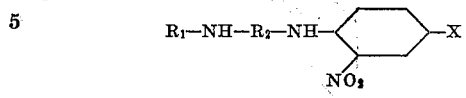

wherein the imino groups stand in para-position to each other, X means a sulfamide radical, $R_1$ stands for a radical of the benzene or naphthalene series or for the cyclohexyl radical and $R_2$ for a radical of the benzene series, at least one of the radicals $R_1$ and $R_2$ containing at least one substituent of the group consisting of sulfonic acid and carboxylic acid groups.

We have found that very valuable brown nitro-dyestuffs are obtainable by condensing a nitro compound of the general formula

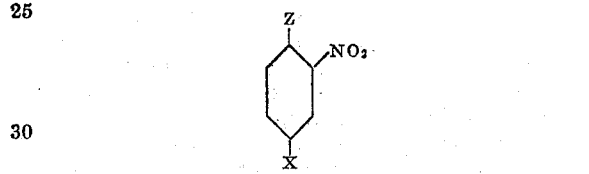

wherein Z stands for halogen or an alkoxy-group and X for a sulfamide radical, with a para-aminophenylarylamine, or a homologue, a substitution product or a hydrogenation product thereof. The dyestuffs dye animal fiber very even brown tints of good properties of fastness, especially of very good fastness to light.

The condensation is conducted in water or in an organic solvent or in a mixture of both according to known methods. The reaction may be performed by heating in a reflux apparatus or by applying raised pressure.

The following examples serve to illustrate the invention, but they are not intended to limit it thereto.

The parts are by weight:

1. 321 parts of 4'-acetamino-4-aminodiphenyl-amine-2-sulfonic acid are suspended in 3 times their weight of water and transformed with the calculated amount of sodium carbonate into the sodium salt, while heating; 293 parts of 1-chloro-2-nitrobenzene-4-sulfodiethylamide and 22 parts of magnesium oxide are then added. The mixture is kept boiling under reflux until the end of the condensation. After cooling, the condensation product crystallizes. The nitro-dyestuff is dissolved in about 6 to 8 parts of hot water, 69 parts of potassium carbonate are added, and the whole is filtered. The potassium salt crystallizes for the greater part; the remaining part is precipitated by means of potassium chloride. The dyestuff dyes wool very even yellowish-brown tints which are fast to light. It is also adapted for dyeing leather and yields even yellowish-brown tints of good fastness to light. The nitro-dyestuff corresponds with the following formula

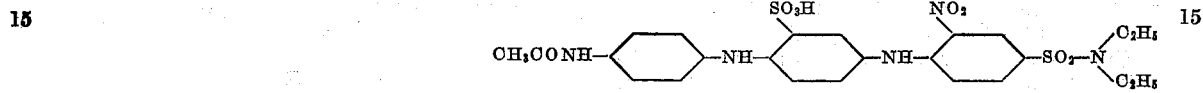

A dyestuff of similar properties is obtained by substituting 264 parts of 4-aminodiphenylamine-2-sulfonic acid for the 321 parts of 4'-acetamino-4-aminodiphenyl-amine-2-sulfonic acid.

2. By condensing 294 parts of 4'-methoxy-4-aminodiphenylamine-2-sulfonic acid in a manner analogous to that described in Example 1 with 265 parts of 1-chloro-2-nitrobenzene-4-sulfodimethylamide in the presence of 69 parts of potassium carbonate, a dyestuff is obtained which, like that described in Example 1, dyes wool yellowish-brown tints of very good evenness and fastness to light.

3. By using instead of 4'-acetamino-4-aminodiphenylamine-2-sulfonic acid, 264 parts of 4-aminodiphenylamine-2-sulfonic acid and heating in the form of the sodium salt for 20 hours with 237 parts of 1-chloro-2-nitrobenzene-4-sulfamide in the presence of 54 parts of calcined sodium carbonate, a dyestuff crystallizes which dyes wool brown tints which are somewhat more yellowish than those obtained with the dyestuff of Example 1 but possess the same evenness and fastness to light.

4. 264 parts of 4-aminodiphenylamine-2-sulfonic acid are dissolved in about 2000 parts of hot water and the calculated amount of sodium carbonate. 312.5 parts of 1-chloro-2-nitrobenzene-4-sulfanilide are added; the whole is heated to boiling, while stirring; and ¾ of the equivalent amount of an aqueous solution of sodium carbonate are introduced, drop by drop, in the course of about 4 hours. The whole is further heated to boiling for about one hour, the remaining portion of the sodium carbonate solution is slowly introduced and the whole is heated to boiling for some hours. The nitro-dyestuff of the following formula

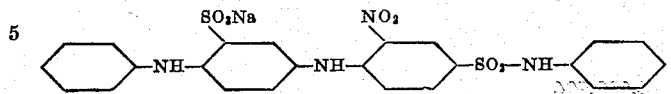

is salted out from the solution with aid of sodium chloride and filtered with suction. The brown powder obtained may be recrystallized from water. The dyestuff dyes wool yellow-brown tints of good fastness to perspiration, to the action of water and to a feeble washing.

A dyestuff of similar properties is obtained, by using in the foregoing example instead of 264 parts of 4-aminodiphenylamine-2-sulfonic acid, 321 parts of 4'-acetamino-4-aminodiphenylamine-2-sulfonic acid.

5. By carrying out the condensation described in Example 4 with 294 parts of 4'-methoxy-4-aminodiphenylamine-2-sulfonic acid or 264 parts of 4-aminodiphenylamine-2-sulfonic acid and 326.5 parts of 1-chloro-2-nitrobenzene-4-sulfo-N-methylanilide, dyestuffs of similar properties are obtained.

6. By replacing the 4'-acetamino-4-aminodiphenylamine-2-sulfonic acid used in Example 1 by 285 parts of 4'-acetamino-4-aminodiphenylamine-2-carboxylic acid, a dyestuff of similar properties is obtained.

Instead of the nitrohalogen-benzenes, used in the foregoing examples, there may also be applied the corresponding nitro-alkoxy-benzenes for the manufacture of the nitro-dyestuffs.

Dyestuffs of similar properties may be obtained by conducting the condensation with, for instance, 1-chloro-2-nitrobenzene-4-sulfopiperidide, 1-chloro-2-nitrobenzene-4-sulfo-cyclohexylamide, 1-methoxy-2-nitrobenzene-4-sulfo-hydroxyethylamide, 1-methoxy-2-nitrobenzene-4-sulfomethylamide, 1-chloro-2-nitrobenzene-4-sulfomethylethylamide, 1-chloro-2-nitrobenzene-4-sulfobutylamide, 1-bromo-2-nitrobenzene-4-sulfo-1'-naphthylamide or 1-ethoxy-2-nitrobenzene-4-sulfo-N-ethyl-anilide.

Instead of the para-aminodiphenylamine-sulfonic- or carboxylic acids others may be used in the same manner, for instance, 4-amino-2-sulfamino-diphenylamine-3'-sulfonic acid, 4-amino-2'-methoxydiphenylamine-2-sulfonic acid, 4-amino-2-carbethoxy-diphenylamine-4'-sulfonic acid, 1-amino-4-cyclohexylaminobenzene-3-sulfonic acid, 1-amino-4-naphthylaminobenzene-3-sulfonic acid, 4'-methyl-4-aminodiphenylamine-2-sulfonic acid, 3'-chloro-4-aminodiphenylamine-2-sulfonic acid, 4'-carboxy-4-aminodiphenylamine-2-carboxylic acid.

We claim:

1. A process of preparing nitro-dyestuffs which comprises condensing in the presence of an acid-binding agent and a solvent nitro-compounds of the general formula

wherein Z stands for a member of the group consisting of halogen and alkoxy and X for a sulfamide radical, with para-aminophenylarylamines of the following formula $$R_1-NH-R_2-NH_2$$

wherein $R_1$ stands for a member selected from the group consisting of radicals of the benzene and naphthalene series and the cyclohexyl radical and $R_2$ for a radical of the benzene series, at least one of the radicals $R_1$ and $R_2$ containing at least one substituent of the group consisting of sulfonic acid and carboxylic acid groups.

2. A process of preparing nitro-dyestuffs which comprises condensing in the presence of an acid-binding agent and a solvent nitro-compounds of the general formula

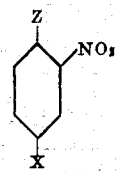

wherein Z stands for a member of the group consisting of halogen and alkoxy and X for a sulfamide radical, with para-aminophenylarylamines of the following formula $$R_1-NH-R_2-NH_2$$

wherein $R_1$ and $R_2$ stand for radicals of the benzene series at least one of which contains at least one substituent of the group consisting of sulfonic acid and carboxylic acid groups.

3. A process of preparing a nitro-dyestuff which comprises condensing in the presence of an acid-binding agent and a solvent 1-chloro-2-nitrobenzene-4-sulfodiethylamide with 4'-acetamino-4-aminodiphenylamine-2-sulfonic acid.

4. A process of preparing a nitro-dyestuff which comprises condensing in the presence of an acid-binding agent and a solvent 1-chloro-2-nitrobenzene-4-sulfanilide with 4'-acetamino-4-aminodiphenylamine-2-sulfonic acid.

5. A process of preparing a nitro-dyestuff which comprises condensing in the presence of an acid-binding agent and a solvent 1-chloro-2-nitrobenzene-4-sulfodiethylamide with 4-aminodiphenylamine-2-sulfonic acid.

6. The nitro-dyestuffs of the following general formula

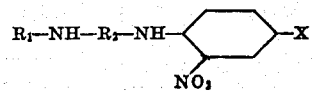

wherein the imino groups stand in para-position to each other, X means a sulfamide radical, $R_1$ stands for a member selected from the group consisting of radicals of the benzene and naphthalene series and the cyclohexyl radical and $R_2$ for a radical of the benzene series, at least one of the radicals $R_1$ and $R_2$ containing at least one substituent of the group consisting of sulfonic acid and carboxylic acid groups, being brown powders which dye the animal fiber very even brown tints of good fastness properties, especially of very good fastness to light and dye leather even brown tints.

7. The nitro-dyestuffs of the following general formula

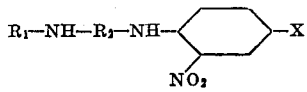

wherein the imino groups stand in para-position to each other, X means a sulfamide radical, $R_1$ and $R_2$ stand for radicals of the benzene series at least one of which contains at least one substituent of the group consisting of sulfonic acid and carboxylic acid groups, being brown powders which dye the animal fiber very even brown tints of good fastness properties, especially of very good fastness to light and dye leather even brown tints.

8. The nitro-dyestuff of the following formula

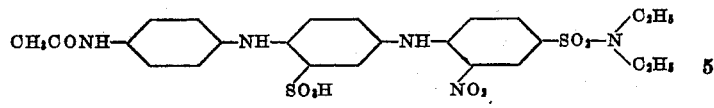

being a brown powder easily soluble in water which dyes wool very even yellowish-brown tints of very good fastness to light and dyes leather even yellowish-brown tints.

9. The nitro-dyestuff of the following formula

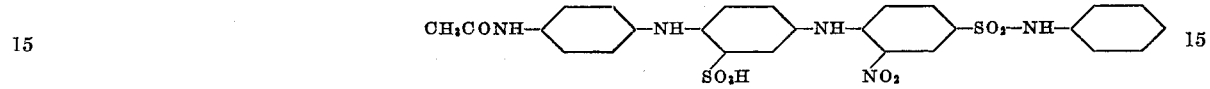

being a brown powder easily soluble in water which dyes wool very even brown tints of very good fastness to light and dyes leather even brown tints.

10. The nitro-dyestuff of the following formula

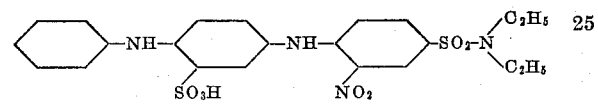

being a brown powder easily soluble in water which dyes wool very even brown tints of very good fastness to light and dyes leather even brown tints.

ERICH FISCHER.
WALTER GMELIN.